United States Patent [19]

Varela

[11] 4,404,240

[45] Sep. 13, 1983

[54] MOBILE

[76] Inventor: Michael A. Varela, 2668 Ringneck Rd., Audubon, Pa. 19401

[21] Appl. No.: 310,638

[22] Filed: Oct. 13, 1980

[51] Int. Cl.³ .................... A63H 33/40; G09B 23/04; G09F 21/00

[52] U.S. Cl. .................................... 428/8; D11/141; 52/DIG. 10; 403/172; 403/217; 428/542.2

[58] Field of Search .............. 428/8 HZ, 8, 12, 542.2; 52/DIG. 10, 227–228; 434/211; 40/617; 46/27, 28, 29; D11/141; 403/172–176, 217–219

[56] References Cited

U.S. PATENT DOCUMENTS

| | | | |
|---|---|---|---|
| 3,422,565 | 1/1969 | Kentfield et al. | 46/29 X |
| 3,830,011 | 8/1974 | Ochrymowich | 52/DIG. 10 |
| 4,055,690 | 10/1977 | Patterson | 428/9 |
| 4,069,832 | 1/1978 | Bingham | 403/172 X |
| 4,259,821 | 4/1981 | Bush | 428/542.2 X |
| 4,274,222 | 6/1981 | Zahn et al. | 52/DIG. 10 |
| 4,295,187 | 10/1981 | Shemitz | 428/12 X |

OTHER PUBLICATIONS

Life Magazine Dec. 7, 1959, pp. 85 and 86.

*Primary Examiner*—Henry F. Epstein
*Attorney, Agent, or Firm*—Frederick J. Olsson

[57] ABSTRACT

The mobile has twelve elongated members positioned with respect to one another to create the appearance of a hexahedron. At each of the eight corners is a flexible joint means joining three rods together and permitting the rods to pivot relative to one another (but maintaining their attachment) so that exterior forces such as air currents or mechanical thrusts cause the mobile to move in an undulating fashion and thereby create changing hexahedron shapes or patterns. The mobile is suspended from a ceiling or from an arm on a stand. Suspension is attained by a pair of threads which are respectively attached to an opposite pair of top members.

6 Claims, 12 Drawing Figures

MOBILE

This invention relates to the decorative arts and in particular relates to decorative pieces of the kind which may be classified as mobiles.

One object of the invention is to provide a mobile comprising elongated members interconnected by flexible joints and adapted to assume a balanced, static condition to create the appearance of an hexahedron of one shape but which are responsive to forces such as mechanical thrusts or air currents to move in an undulating fashion and thereby create changing hexahedron shapes or patterns.

Another object of the invention is to provide a mobile of the kind mentioned wherein the flexible joints, the elongated members and the suspension point cooperate for achieving the balanced and the changing conditions.

Another object of the invention is to provide mobiles of the kind mentioned, the interconnected corners of which allow freedom for relative motion of the parts of the device in the same or different directions while maintaining said interconnection.

Another object of the invention is to provide mobiles of the kind mentioned each respectively being made of a different size so as to be nestable one inside the other thereby enhancing the likelihood of obtaining multiple shapes or pattern effects.

Another object of the invention is to provide mobiles of the kind mentioned made of different sizes and adapted to be suspended in a side-by-side manner and thereby increase the pattern effects.

Another object of the invention is to provide mobiles of the kind mentioned wherein the physical dimensions permit one or more to surround a lighting fixture and thereby obtain substantially different pattern effects.

Another object of the invention is to provide mobiles of the kind mentioned wherein the structure is formed by elongated members of different hues or colors.

Another object of the invention is to provide a mobile of the kind mentioned wherein the elongated members can be of a variety of geometric cross sections and surfacing of various reflectivity whereby to obtain a wide variety of changing pattern effects.

The invention will be described below in connection with the following drawings therein:

Figure 1:
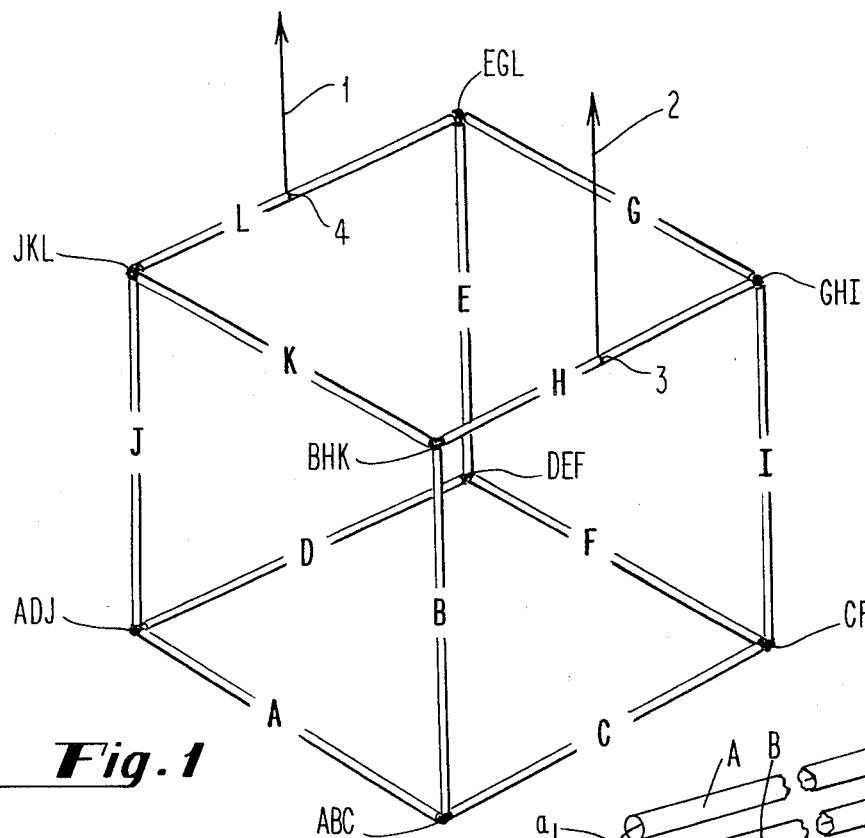
FIG. 1 is a perspective of a mobile constructed in accordance with the invention, the mobile being shown in the static condition to create the appearance of a cubical hexahedron.
Figure 9:
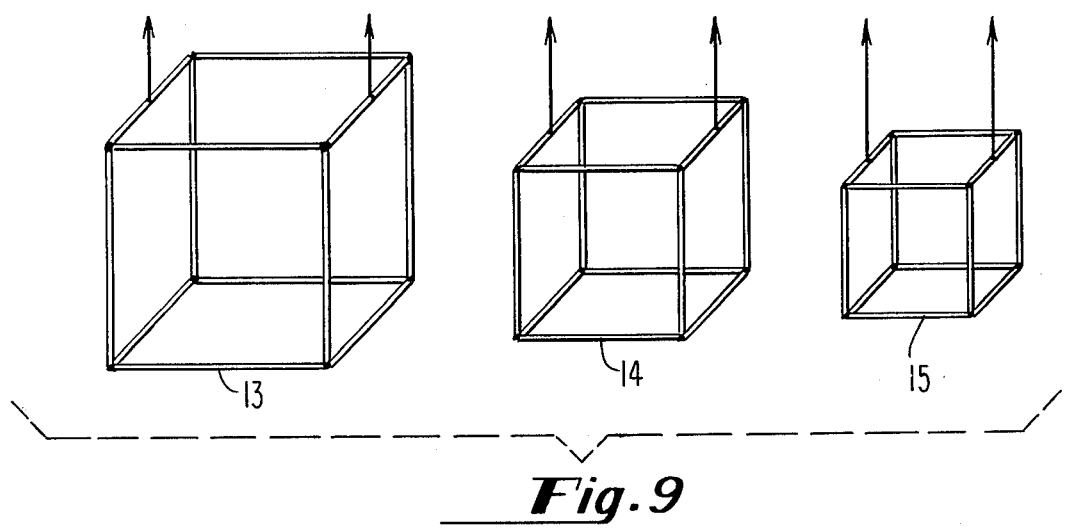
Figure 10:
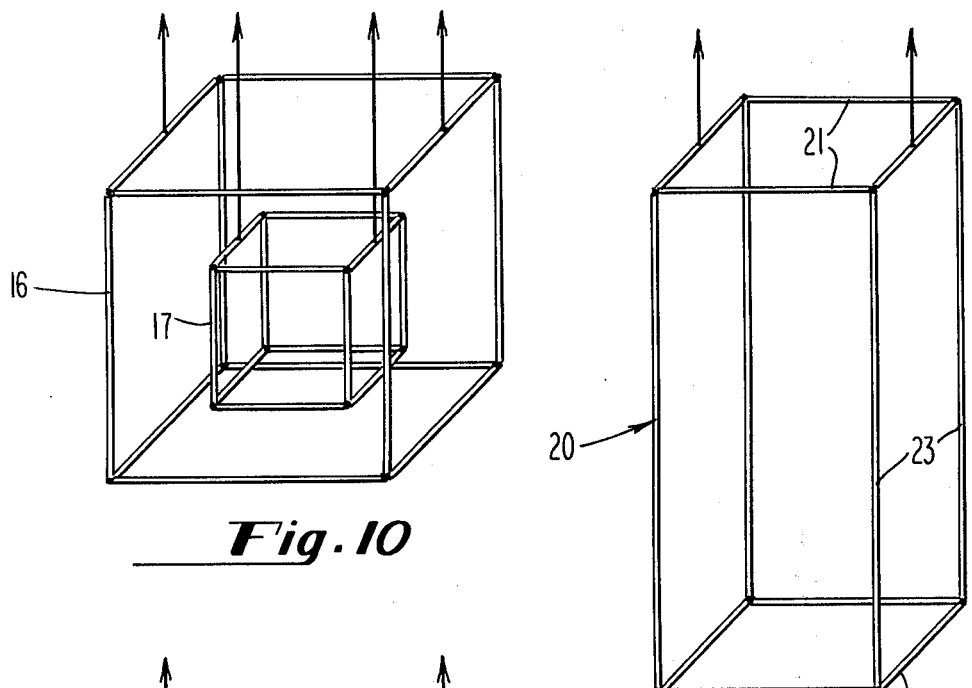
Figure 12:
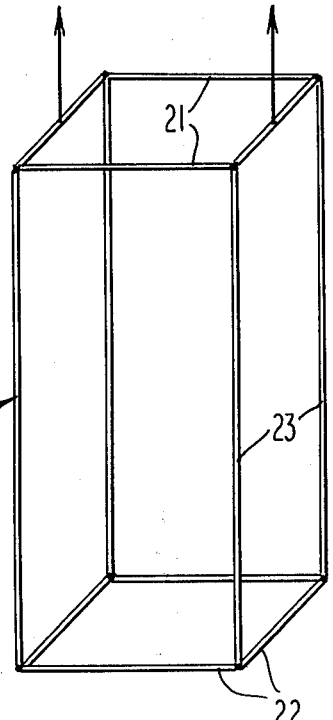
Figure 11:
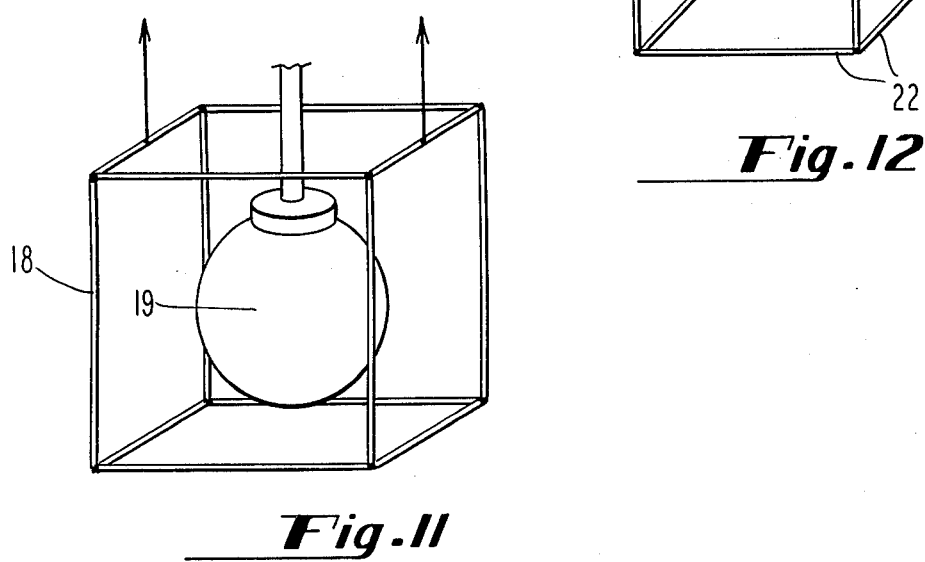

FIGS. 4, 5, 6, 7, and 8 are perspective, enlarged, fragmentary views to illustrate the assembling of the mobile of FIG. 1;

FIG. 9 is a view to illustrate a side-by-side arrangement;

FIG. 10 is a view to illustrate a nested arrangement;

FIG. 11 is a perspective view to illustrate a mobile surrounding a lighting fixture; and FIG. 12 is a perspective view showing the mobile arranged to create the appearance of a non-cubical hexahedron.

Figure 2:
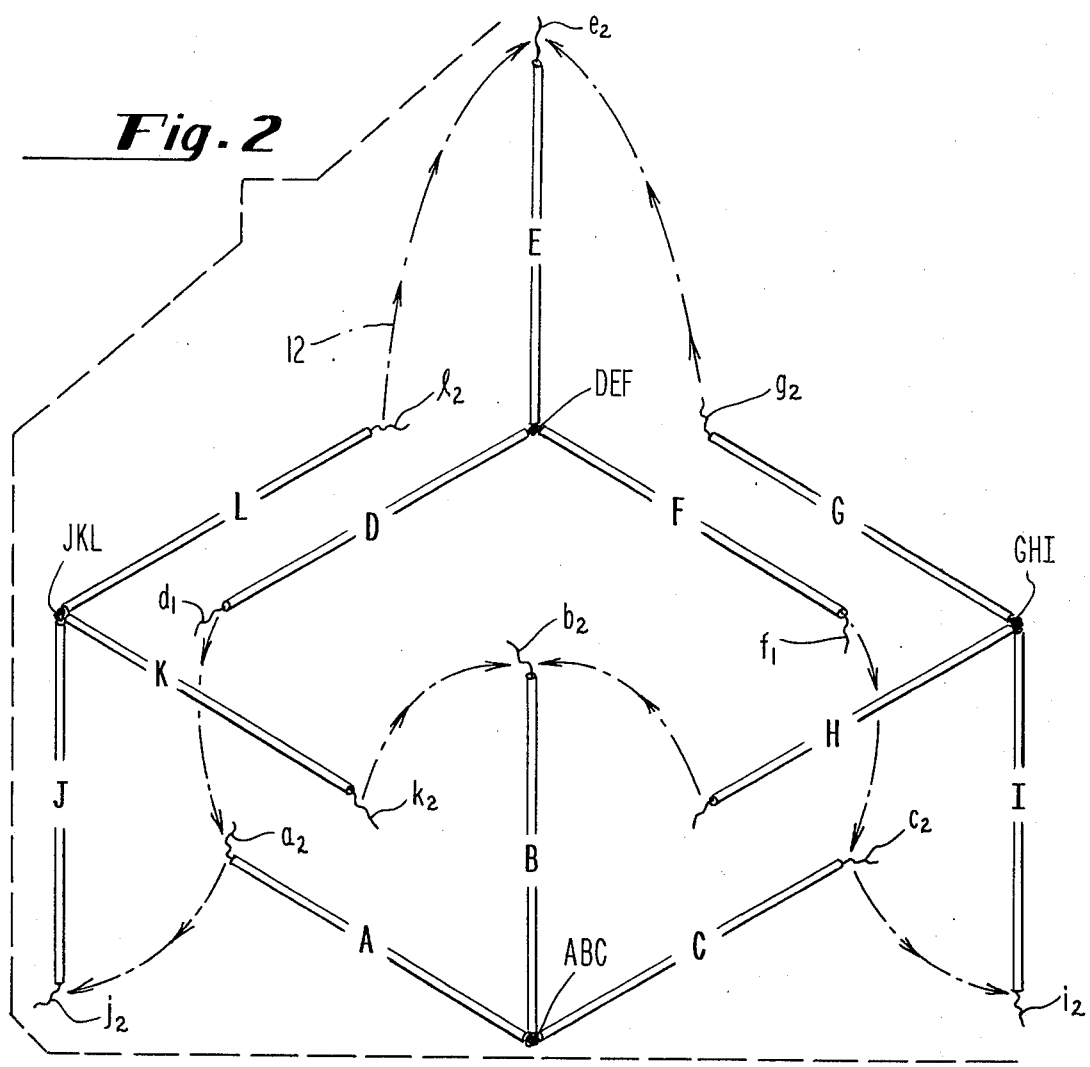
FIG. 2 is an exploded view to illustrate the assembly of the parts comprising the mobile of FIG. 1.
Figure 3:
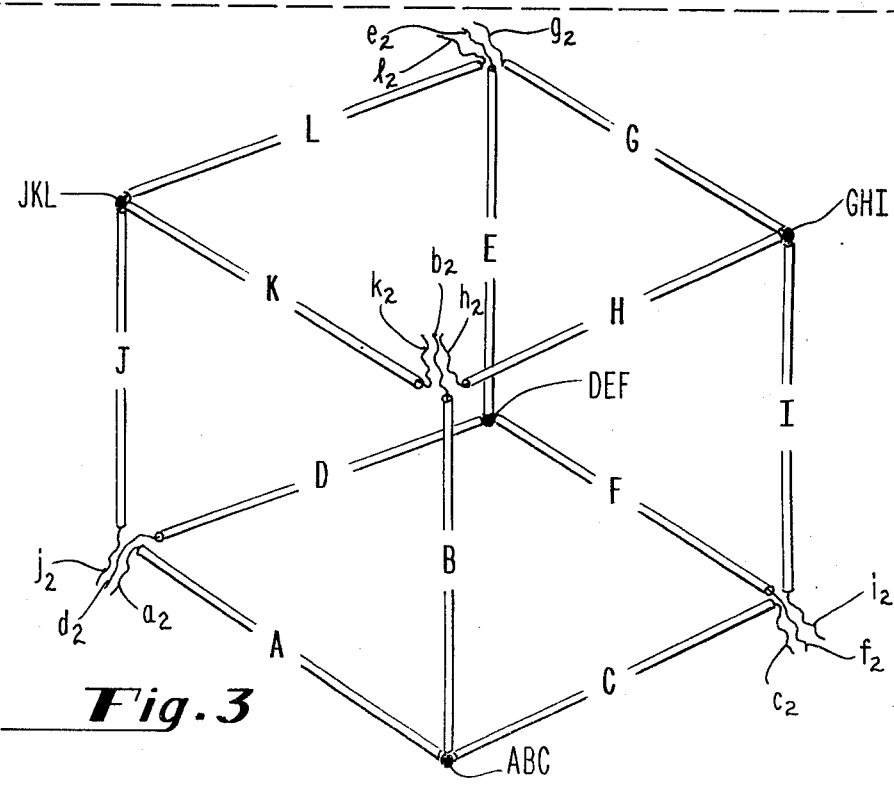
FIG. 3 is a perspective view to further illustrate the assembly of the parts comprising the mobile of FIG. 1.

In FIGS. 1, 2, and 3, I have shown capital letters A through L intermediate the elongated members making up the parts of the cube and these letters will be used to designate the members. This has been done for ease in explaining the manner of fabricating or assembling the mobile. It will be understood, of course, that such letters are not a part of the structure of an elongated member.

In FIGS. 1, 2, and 3, the elongated members A through L are identical in size, shape, and weight. To achieve the foregoing it is preferable that the members be made of the same material which conventionally is either metal or plastic.

With respect to the term "elongated member", it will be understood that this includes a hollow elongated body such as a tube of a solid elongated body such as a rod. Such tubes or rods will be of standard round or square shape or some other desired geometric shape.

The mobile of FIGS. 1, 2, and 3 is illustrative of a mobile which I have successfully built and demonstrated. This employed brass tubes approximately 15 cm. in length with an outside diameter of 0.280 cm. and an inside diameter of 0.200 cm. and a weight of approximately 10 grams.

In connection with the weight of the elongated members it is important that the same should not be extremely light in weight. The extra weight enhances the ability of the mobile to be more responsive to forces such as mechanical thrusts or air currents and thus provide the desired changing patterns. Naturally, the weight must not be so great that inertia will inhibit the mobile from moving out of its static condition.

Another important factor in achieving the response is that at each joint of the mobile the same should be highly flexible yet providing for maintaining the members together. The flexibility must allow the rods to easily pivot relative to each other.

A further important factor in providing the response characteristic is that the mobile be precisely balanced in its static condition so that when the moving forces are removed the mobile will return to the static condition. This is achieved by the structure of the elongated members and the suspension points.

The structure aspect of the elongated members has been commented on and the manner of suspension will now be described.

In FIG. 1 the top rods L and H have fine threads 1 and 2 connected to the same suspension points 3 and 4. These fine threads 1 and 2 extend upwardly and are anchored to a ceiling or to a horizontal rod or the like which in turn may be connected to a stand or the ceiling. The threads are connected to the tubes L and H at 3 and 4 so that they are firmly bound to the same yet so that with finger pressure the connection point of the threads can be moved axially along the tubes. After the mobile is suspended, the threads can be adjusted so as to obtain the correct balance, i.e. with the face formed by tubes G, H, K, and L and A, D, F, and C extending horizontally and the faces formed by intermediate tubes B, J, E, and I extending vertically.

The threads 1 and 2 are preferably a very fine black nylon or clear monofiliment nylon so that the same will be substantially invisible and create the illusion of a free floating mobile.

A typical procedure for joining the tubes A through L together in the form of the cube of FIG. 1 will now be explained.

Figure 4:
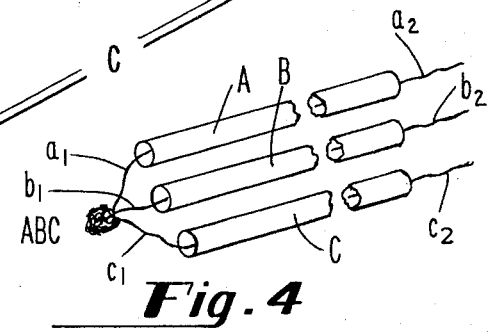

First of all the twelve tubes are all cut to the same length and divided into four groups of three tubes each. In each tube a nylon thread is put through the same and severed so that about two or three inches of thread extend out of each end. The threads extending out of the tubes is illustrated in FIG. 4 where the tube A has threads a and $a_2$, tube B has threads b and $b_2$, and tube C has threads c and $c_2$. The threads in the other tube are correspondingly designated in FIGS. 2 and 3.

Each thread is adapted to be supported in its tube by a plug means. The plugs may take a variety of forms, for example, in FIG. 5 I have shown an arrangement I have used. The plug 5 on thread 6 has been formed by a narrow band of paper wrapped around the thread 6. The diameter of the plug is slightly greater than the inside diameter of the tube. The plug is forced into the end of the tube with the end of the plug about a quarter of an inch in from the end of the tube.

Figure 6:
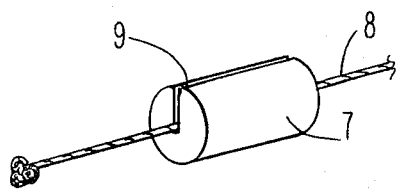
Figure 5:
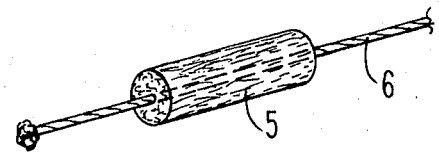

The invention comtemplates a molded plug such as the plug 7 on the thread 8 shown in FIG. 6. Thus, the plug 7 is cylindrical in shape and has an axially extending slot 9 which supports the thread 8. The plug has a slightly larger diameter than the ID of the tube and when inserted into the tube the slot closes over the thread and holds the same in position.

After the plugs have been inserted in all the tubes, the threads on one end of the three tubes of each group are then connected together so as to form a flexible joint.

For example, referring to FIGS. 5, 4, 1, 2, and 3 it will be seen that the tubes A, B, and C have their threads $a_1$, $b_1$, and $c_1$ connected together to form the joint ABC. The joint ABC is made simply by knotting the threads $a_1$, $b_1$, and $c_1$ together and then cutting off the excess.

Figure 7:
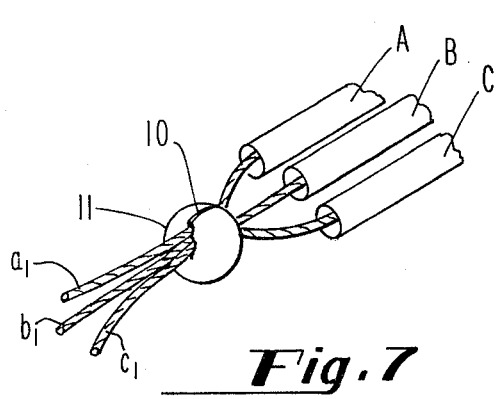
Figure 8:
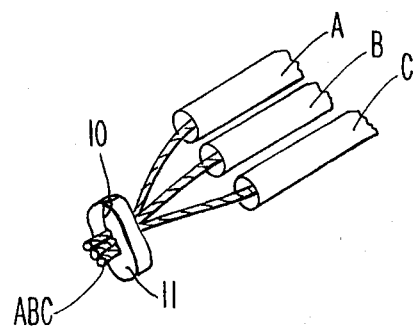

Another type of joint which I have successfully made employs a lead split shot (the kind used on fishing lines to provide extra weight) the latter being illustrated in FIGS. 7 and 8. In FIG. 7 the tubes A, B, and C, the threads $a_1$, $b_1$, and $c_1$ extending out of the tubes A, B, and C are disposed in the slot 10 of the split shot 11. After the threads are arranged as shown, a pair of pliers is used to deform the shot 11 so as to firmly hold the threads in the slot 10 and the excess thread cut off as indicated in FIG. 8. This forms the joint ABC.

After the joints ABC, DEF, GHI, and JKL in the four groups have been fabricated as above described, the groups are laid out in a pattern for fabricating the remaining four joints.

Thus, referring to FIG. 2, it will be seen that the tubes A, B, and C are arranged in acute-angle pattern opposite the tubes D, E, and F arranged in a star pattern. The tubes G, H, and I and the tubes J, K, and L are also arranged in acute-angle patterns respectively on the right and left hand sides.

In FIG. 2 I have shown arrows extending from a free thread on the end of a tube to the free thread on the end of another tube. For example, the arrow 12 extends from thread $l_2$ to thread $e_2$. This is to indicate which threads are to be interconnected. After setting up the groups of tubes as shown in FIG. 2, the same are then individually moved toward each other to obtain the condition as shown in FIG. 3 where it will be seen that the various free threads are adjacent one another and available for making the remaining joints. Thus, the free threads are connected together either by knotting or by using a split shot as described above.

Thus, the threads are connected as follows: threads $e_2$, $g_2$, and $l_2$ are connected to form joint EGL; threads $a_2$, $d_2$, and $j_2$ are connected to form joint ADJ; threads $b_2$, $h_2$, and $k_2$ are connected to form joint BHK; cut threads $c_2$, $f_2$, and $i_2$ are connected to form joint CFI.

Each of the joints ABC, etc. is located with respect to the end of its tubes to hold the tube ends close together but without interfering with pivoting of the tubes.

The next step is to attach the threads 1 and 2 in the manner as previously described.

Typical examples of the utility of the mobile of the invention are illustrated in FIGS. 9 through 12.

In FIG. 9 cubes 13, 14, and 15 are arranged in a side-by-side fashion as shown. The cubes are of smaller dimensions extending from left to right. It will be understood, of course, that a myriad of other side-by-side patterns of a variety of cube sizes may be employed.

In FIG. 10, the cubes 16 and 17 are nested. While I have only shown a nesting arrangement of two cubes, it will be apparent that many more cubes can be used to construct the nested effect. Also, it will be apparent that the nesting may take a variety of forms. For example, as shown in FIG. 10 the cube 13 is centered within the cube 12, however, the cube may occupy a different vertical position, for example, all the way down to the bottom of the cube or all the way up to the top of the cube.

In FIG. 11, I have shown the cube 18 surrounding the lighting fixture 19. While I have shown a single cube in FIG. 11 it will be apparent that a nesting arrangement such as shown in FIG. 10 may be employed.

In the foregoing I have referred to the mobiles arranged to create the appearance of cubical hexahedrons. However, it will be understood that the invention contemplates mobiles arranged to create the appearance of non-cubical hexahedrons. For example, FIG. 12 illustrates the mobile 20 wherein the members 21 and 22 comprising the top and bottom faces are square in form and the longer members 23 comprising the side or vertical faces are rectangular in form. This forms a non-cubical hexahedron. Another typical hexahedron form is where each face is rectangular and the mobile is a parallelepiped. Parenthetically, it will be apparent that the mobile 20 as shown in FIG. 12 may be reversed 90° and suspended from a pair of the long members 23 to create a different effect. The parallelepiped mobile may be similarly suspended to create change in appearance.

I claim:
1. In a mobile:
twelve elongated members positioned with respect to one another to create the appearance of at least one hexahedron shape;
eight flexible joint means each respectively joining three members together to form four corners of said hexahedron shape and providing for the members to remain attached to one another and to pivot relative to each other;
support means;
connection means respectively connecting the support means to an opposite pair of members for suspending the mobile and providing for relative motion between the support means and the members connected thereto; and
the elongated members, the flexible joint means, and the connection means providing for the mobile to assume a balanced, static condition whereby the members create the appearance of an hexahedron of one shape and also for the members to move relative to each other upon the application of forces thereto whereby to create the appearance of an hexahedron of a shape different from said one shape.
2. In a mobile:

twelve elongated members positioned with respect to one another to create the appearance of at least one hexahedron shape;

eight flexible joint means each respectively joining three members together to form four corners of said hexahedron shape and providing for the members to remain attached to one another and to pivot relative to each other;

support means;

connection means respectively connecting the support means to an opposite pair of members for suspending the mobile and providing for relative motion between the support means and the members connected thereto; and the elongated members, the flexible joint means, and the connection means providing for the mobile to assume a balanced, static condition whereby the members create the appearance of an hexahedron of one shape and also for the members to move relative to each other in an undulating fashion upon the application of forces thereto whereby to develop multiple changes from said one hexahedron shape and thereby create a plurality of appearances of hexahedron shapes.

3. The mobile of claim 1 wherein each elongated member is a tube and each flexible joint means comprises a thread extending from the end of a tube and means connecting the threads together.

4. The mobile of claim 3 wherein the means connecting the threads together is a knot formed by the threads.

5. The mobile of claim 3 wherein the means connecting the threads together is a deformed split shot.

6. The mobile of claim 3 wherein the thread in each tube is supported by plug means respectively disposed adjacent the ends of the tube.

* * * * *